(12) United States Patent
Garcia

(10) Patent No.: US 8,977,402 B2
(45) Date of Patent: Mar. 10, 2015

(54) METHOD AND SYSTEM FOR OPERATING A WIND POWER PLANT COMPRISING A NUMBER OF WIND TURBINE GENERATORS

(75) Inventor: Jorge Martinez Garcia, Risskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 1106 days.

(21) Appl. No.: 13/001,277

(22) PCT Filed: Jun. 25, 2009

(86) PCT No.: PCT/EP2009/057944
§ 371 (c)(1),
(2), (4) Date: Mar. 8, 2011

(87) PCT Pub. No.: WO2010/000664
PCT Pub. Date: Jan. 7, 2010

(65) Prior Publication Data
US 2011/0148114 A1    Jun. 23, 2011

Related U.S. Application Data

(60) Provisional application No. 61/076,919, filed on Jun. 30, 2008.

(30) Foreign Application Priority Data

Jun. 30, 2008   (DK) .................... 2008 00900

(51) Int. Cl.
*G05D 11/00*   (2006.01)
*H02J 3/38*   (2006.01)

(52) U.S. Cl.
CPC .............. *H02J 3/386* (2013.01); *Y02E 10/763* (2013.01)
USPC ................. 700/287; 700/31; 60/698; 237/13; 703/18; 702/182

(58) Field of Classification Search
CPC ......... Y02E 10/00; Y02E 10/10; Y02E 10/70; Y02E 10/723; Y02E 10/76; H02K 7/18; H02K 7/183; Y04S 10/16; G05B 13/04; G05B 13/042; G05B 17/00; G05B 17/02; G05B 19/045
USPC ....... 700/287, 29–31; 60/698; 237/13; 703/4, 703/18; 702/182
See application file for complete search history.

(56) References Cited

U.S. PATENT DOCUMENTS

| | | | |
|---|---|---|---|
| 7,099,800 B2 * | 8/2006 | Henriksen et al. | 702/187 |
| 2004/0124812 A1 | 7/2004 | Delmerico et al. | |
| 2006/0113801 A1 * | 6/2006 | Schubert et al. | 290/44 |
| 2007/0213956 A1 * | 9/2007 | Nasle et al. | 702/182 |
| 2008/0195255 A1 * | 8/2008 | Lutze et al. | 700/291 |
| 2009/0096211 A1 * | 4/2009 | Stiesdal | 290/44 |
| 2010/0207463 A1 * | 8/2010 | Fortmann et al. | 307/153 |

FOREIGN PATENT DOCUMENTS

| | | |
|---|---|---|
| WO | 2004059814 A2 | 7/2004 |
| WO | 2006120033 A2 | 11/2006 |

OTHER PUBLICATIONS

J. Usaola et al., "Transient Stability Studies in Grids with Great Wind Power Penetration: Modeling Issues and Operation Requirements," in Proceedings of 2003 IEEE PES General Meeting, Toronto, Canada, Jul. 13-17, 2003.*

Kazachkov et al., "Modeling Wind Farms for Power System Stability Studies" 2003 IEEE Power Engineering Society General Meeting. Conference proceedings. Toronto, Ontario, Canada, Jul. 13-17, 2003.

Denmark Patent and Trademark Office, Search Report issued in related Denmark Patent Application No. PA 2008 00900 dated Jan. 16, 2009.

European Patent Office, International Search Report issued in related International Application No. PCT/EP2009/057944 dated Jan. 16, 2010.

\* cited by examiner

*Primary Examiner* — Mohammad Ali
*Assistant Examiner* — Sheela S Rao

(74) *Attorney, Agent, or Firm* — Patterson & Sheridan, LLP

(57) ABSTRACT

This invention relates to a method and a system for operating a wind power plant (1) connected to a power grid (2), the wind power plant comprising a number of wind turbine generators. The method comprises the steps of: setting up (101) a number of different models, each model emulating an electrical behavior of an electrical system, such as a load or a power generating unit, connected to the power grid; detecting (102) value(s) of a number of power grid parameters; selecting (103) one of the number of models, based on a number of values out of a set comprising the detected power grid parameter value(s) and ambient parameter value(s), or based on an external command signal; in the selected model, calculating (104) electrical output values of the model, based on the detected grid parameter values; calculating (105) electrical reference values for the wind power plant, based on the calculated electrical output values of the model; and calculating (106) electrical reference values for each wind turbine generator based on the calculated electrical reference values for the wind power plant. The method may further comprise controlling (107) the wind turbine generators according to the calculated electrical reference values for each wind turbine generator.

17 Claims, 5 Drawing Sheets

METHOD AND SYSTEM FOR OPERATING A WIND POWER PLANT COMPRISING A NUMBER OF WIND TURBINE GENERATORS

TECHNICAL FIELD

The present invention relates to a method and a system for operating a wind turbine, either a wind power plant, or a cluster of wind power plants, each wind power plant comprising a number of wind turbine generators, the wind power plant(s) being connected to an external power network.

BACKGROUND OF THE INVENTION

A wind power plant (also called a wind farm) comprises a number of wind turbines: Each wind turbine includes a rotor that converts the kinetic energy in the wind into mechanical energy. The mechanical energy is then converted to electricity by a generator which is also included in the turbine.

When the wind power plant is connected to a power grid, the electricity generated by the generators is delivered to the power grid, which transmits electricity to different consumers/loads. This connection is done through at least one connection point.

Management of the power grid is a difficult task in order to provide customers with a certain level of electricity quality. It is desirable that the power grid has well defined and constant parameters, such as a certain nominal grid voltage and a nominal frequency, e.g. 50 Hz in Europe and 60 Hz in the US.

The power grid links different electrical installations, i.e. loads or generators, such as power plants, each of them having a behaviour as seen from the grid. For example, some consumers/loads behave like impedances and some generation power plants use synchronous generators with different turbines and controllers.

However, the stability of the different grid parameters is dependent on a variety of variables including the balance between generated power and consumed power in the grid in real time. Any imbalance leads to changes in e.g. the grid frequency. When more power is generated than consumed in the grid, the frequency tends to increase. When more power is consumed than generated, the frequency tends to decrease.

A problem with wind power plants is that they generally work in an unpredicted way, from a power grid point of view, due to variations in e.g. the wind speed. As a result, it is hard to ensure that the wind power plant will interact optimally with the power grid.

As the proportion of electrical energy produced by wind power plants increases compared to the total electrical energy produced from conventional power plants in a power grid, the power grid is more and more influenced by the way the wind power plants work. Therefore, it becomes more and more important for wind power plants in contributing to help maintain the characteristics of the power grid by controlling e.g. the real power output of a wind power plant. This would enable a more efficient utilization of all production units, and would improve the possibilities for power grid planning.

EP1467463 describes a wind power plant and a method for operating the wind power plant, which method includes controlling the real power output of the wind power plant depending on a measured frequency in the power grid to which the wind power plant is connected. The output of real power of the wind power plant is regulated or controlled according to the measured grid frequency.

WO2006120033 discloses a wind power plant and a method for operating it, which method includes controlling the power factor or the reactive power of the wind power plant depending on a measured voltage in the power grid to which the wind power plant is connected. In the invention according to WO2006120033, the real power output or the reactive power of the wind power plant is regulated or controlled according to the measured grid voltage.

Thus, both EP1467463 and WO2006120033 describe control methods that depend on only one grid parameter (frequency and voltage respectively). In each of the methods, the choice of parameter is predetermined and can not be changed. Furthermore, the control method is fixed and is always performed in the same way.

However, there is a desire for wind power plants that are controlled in a more flexible way, such that the way the wind power plants behave may vary in time. There is also a need for a method wherein the choice of parameter to be used for controlling the wind power plant can vary in time.

SUMMARY

In view of the above, an object of the invention is to provide a method for operating a wind power plant, which method alleviates the above mentioned problems with prior art methods.

In particular, an objective is to provide a method for operating a wind power plant, which method is flexible in such a way that it is possible for the wind power plant to electrically behave differently in time. For example, the method should make it possible for a wind power plant to behave electrically as a load at certain times and to behave electrically as a synchronous power plant at certain times.

A further object of the invention is to provide a method for operating a wind power plant, which method is flexible in such a way that depending on values of an input parameter the wind power plant may behave electrically in different ways. For example, the method should make it possible for a wind power plant to behave electrically as a load if an input parameter has a certain value and to behave electrically as a synchronous power plant if the input parameter has another value or depending on another input parameter.

A still further object is to provide a system for operating a wind power plant, which system is flexible in such a way that it is possible for the wind power plant to behave differently in time.

Yet another object is to provide a system for operating a wind power plant, which system is flexible in such a way that depending on values of an input parameter the wind power plant may electrically behave in different ways.

Another object is to provide a system and a method for operating a wind power plant that is economically advantageous for an operator of the power grid or for the owner of the wind power plant.

Yet another object of the invention is to provide a system and a method for operating a wind farm that improves the use of production resources in a power grid.

According to a first aspect, the present invention is realized by a method for operating a wind power plant connected to a power grid, which wind power plant comprises a number of wind turbine generators. The method comprises the following steps:

setting up a number of different models, each model emulating an electrical behaviour of an electrical system, such as a load or a power generating unit, connected to the power grid, detecting values of the power grid parameters;

selecting one of the number of models, based on a number of values out of a set comprising the detected grid parameter value(s) and ambient parameters, or based on an external command signal;

in the selected model, calculating electrical output values of the model, based on the detected grid parameter values;

calculating electrical reference values for the wind power plant, based on the calculated electrical output values of the model;

calculating electrical reference values for each wind turbine generator based on the calculated electrical reference values for the wind power plant;

By the term "electrical reference value" is meant the value of any electrical quantity, such as Current, Voltage, Output power or reactive power.

By the term "grid parameter" is meant any electrical quantity that could be measured for the grid, such as Current, Voltage, Output power, reactive power or grid frequency.

By the term "ambient parameter" is meant any parameter outside the power system that may influence the selection of model, such as temperature $T_a$, Wind speed $W_a$, Electricity price, Time $Ti_a$.

By the term "an external command signal" is meant a signal from outside the power plant, for example from the grid operator, i.e. the manager of the transmission system or from a customer, such as the owner of the wind power plant, which signal may be a command for which model to select.

The models set up are software models. Each model emulates an electrical behaviour of a certain electrical system, e.g. a type of load or a type of power generating unit, if this electrical system would be connected to a power grid having the same characteristics as the current power grid.

The term "a wind power plant" would not only cover a single power plant but also a cluster of wind power plants connected to the power grid. The cluster of power plants do not need to be close to each other.

By setting up a number of models, each model defining an electrical behavior that could be desirable for the wind power plant in the power grid depending on input parameters, and selecting which of the number of models to use based on a value of the input parameters, a value of an ambient parameter or a command from the grid operator, it is possible to control the wind power plant to behave in real-time according to an advantageous behavior at a certain time. For example, if frequency values of the grid indicates that at one stage it may be advantageous to operate the wind power plant to behave similar to a synchronous power plant, a model which emulates electrical behavior of a synchronous power plant is selected for calculating output power values of the model. In the model, real-time parameter values of the grid are used as input values. The calculated output power values of the synchronous power plant model are then used to calculate output power values of the wind power plant, output power values of which are then used to control the wind power plant, and its individual wind turbine generators. In a special case, the calculated output power values of the model can be used unmodified for operating the wind power plant.

Further, by using the ambient parameter values, i.e. values of electricity price, wind speed etc. for selecting the model to use, there will be possibility to operate the wind power plant with other purposes than e.g. improving electrical characteristics of the power grid, such as operating the wind power plant according to cost-effectiveness for the wind power plant owner and/or the power grid owner.

According to an embodiment, the values of a number of ambient parameters are values forecasting an ambient parameter, such as day time, date, forecasting wind speed or electricity price. By detecting forecasting values of ambient parameters, such as forecasting wind speed and electricity price, and use the forecasting values for selecting model, e.g. the cost-effectiveness of the wind power plant could be increased.

According to another embodiment, wherein the wind power plant further comprises an energy storage system, the method further comprises the step of calculating electrical reference values for the energy storage system, based on the calculated reference values for the wind power plant. By equipping the wind power plant with an energy storage system it may be possible to operate the wind power plant as a load, for example in times when there is low demand in the power grid, and store the received power from the network in the energy storage system, to be used later in the network when demand increases. Similarly, power produced by the wind power plant could be stored in the energy storage system for being delivered to the power grid later. In this case, the model selected decides whether power should be delivered from or to the energy storage system.

According to yet another embodiment, the value(s) of the power grid parameters are detected in real-time. By using real-time values as input values in the selected model a rather precise control of the wind power plant according to requested behaviour is achieved, since the input data is updated.

According to still another embodiment, the value(s) of the ambient parameters are detected in real-time. By using real-time values as input values in the selected model a more precise control of the wind power plant according to requested behaviour is achieved, since the data is updated. For example, if the current wind speed is known, the power plant can be better be operated according to calculated values. In addition, it may be possible to predict behaviour the coming seconds, information that can be used when selecting model. As a result, the method of operating a wind power plant can result in using even more up/to/date values and the best model for the moment.

According to another embodiment, the detected power grid parameter value is a value indicating an electrical disturbance of the grid. Based on a value indicating electrical disturbance of the grid, such as a frequency deviation, it will be possible to select a model emulating electrical behaviour of a synchronous machine. Such a model will as output values give power reference values for the wind power plant that when used to control the wind power plant will compensate for such electrical disturbances in the grid.

According to a second aspect, the present invention is realized by a system for operating a wind power plant connected to a power grid, wherein the wind power plant comprising a number of wind turbine generators. The system comprises:

A model creating unit for setting up a number of different models, each model emulating an electrical behaviour of an electrical system, such as a load or a power generating unit, connected to the power grid;

A detecting unit for detecting value(s) of a number of power grid parameters;

A model selector for selecting one of the number of models, based on a number of values out of a set comprising the detected power grid parameter value(s) and ambient parameter value(s), or based on an external command signal;

A first calculation means for calculating electrical output values of the model, based on the detected grid parameter values;

A second calculation means for calculating electrical reference values for the wind power plant, based on the calculated electrical output values of the model;

A third calculation means for calculating electrical reference values for each wind turbine generator based on the calculated electrical reference values for the wind power plant.

According to a third aspect, the invention is realized by a software program product for carrying out the method according to any of the claims of the first aspect when said software program product is run on a computer or in another programmable device.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. As an example, the term "a wind power plant" should be interpreted as at least one wind power plant, e.g. a cluster of power plants. Further, the steps of any method disclosed herein do not have to be performed in the exact order disclosed, unless explicitly stated. The term "a number of" should be interpreted as "at least one", e.g. "a number of wind turbine generators" should be interpreted as "at least one wind turbine generator".

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
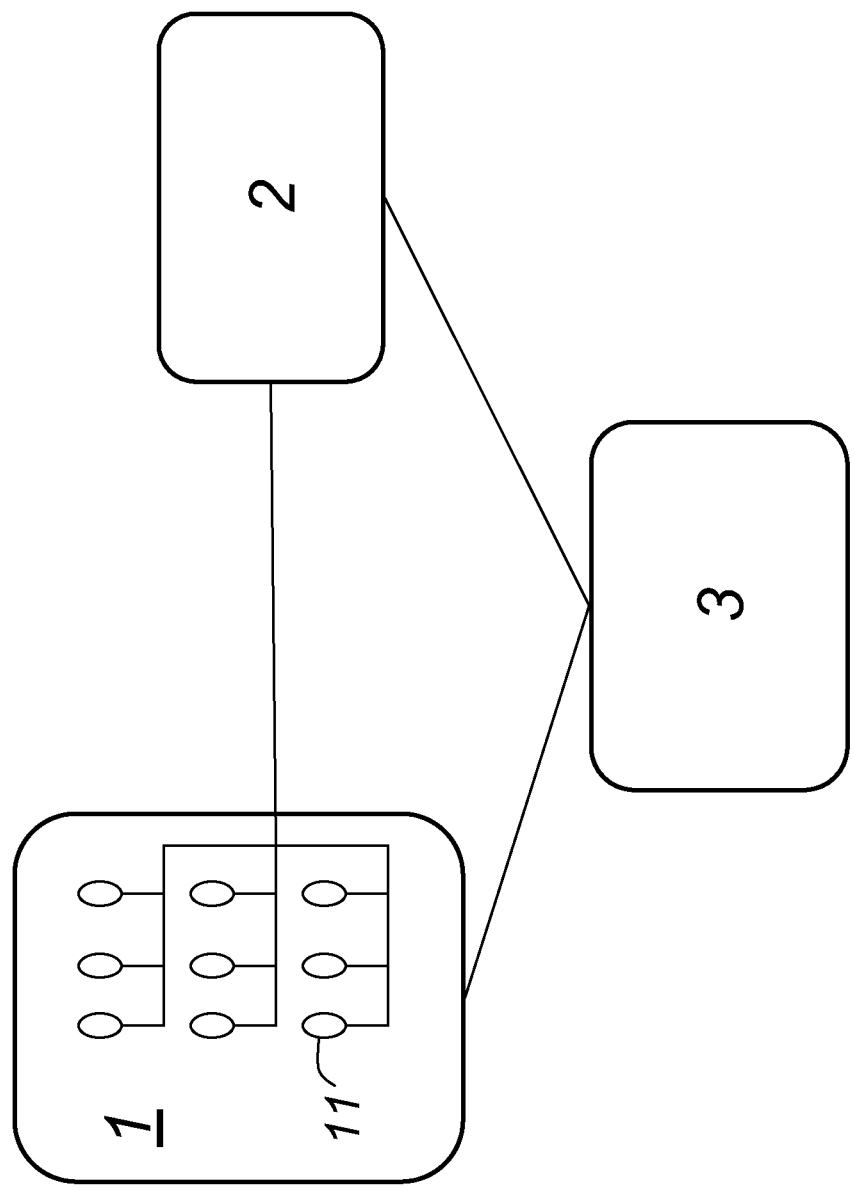
FIG. 1 illustrates a schematic block diagram of a power system for which a control system according to the invention could be used.

FIG. 1 illustrates a power system with a wind power plant 1 that is connected to a power grid 2, wherein the wind power plant is controlled by a control system 3, which may comprise a system for operating a wind power plant according to the invention. The wind power plant comprises a number of wind turbine generators (WTGs) 11. The power grid 2 can comprise a number of loads and power plants.

The system according to the invention could be placed according the FIG. 1, i.e. as a separate node connected to the power grid and to the wind power plant, e.g. in a central despatch. Alternatively, the system of the invention could be placed as a sub-unit in the wind power plant or even in a one single WTG, for example if the WTG is a full converter.

A power grid can have all types of electrical systems, i.e. loads or generators (power plants) connected to it. Every type of load or power plant has a typical behaviour for active power P and reactive power Q, following the next coefficients:

$\Delta P/\Delta f_{grid}$
$\Delta P/\Delta V_{grid}$
$\Delta Q/\Delta f_{grid}$
$\Delta Q/\Delta V_{grid}$ I.e. if the grid frequency changes, the real power produced from a generator will change in a certain way depending on the type of generator, a synchronous power plant for example has a certain electrical behaviour.

Due to the fact that the wind turbine generators of a wind power plant can, at least in some way, control its active and reactive power, the wind power plants are able to emulate P-Q behaviour characteristics of other power plants or loads, at least during disturbances in the electrical power grid.

It may be advantageous from a power grid point of view to operate a wind power plant to emulate a certain electrical behaviour, e.g. of another power plant. Although, the best possible electrical behaviour for the wind power plant may vary in time. Therefore, the invention aims at achieving the best possible electrical behaviour of the wind farm at any time.

According to an embodiment of the invention, a model of a certain type of electrical behaviour that at one stage is advantageous for the wind power plant is used, the model is run in real-time using data measured of the grid, and the reaction of the model is used as a command reference for the wind power plant, and therefore for the wind turbines and other possible elements of the wind power plant such as storage device, capacitors banks, static VAr compensator, etc. For this reason, a number of models of electrical behaviour that could be advantageous for a wind power plant when used in a power grid is set up in a first stage, each model defining a certain electrical behaviour. Thereafter, in real-time, values of a number of parameters of the power grid to which the wind power plant is connected is detected. Based on the values of the parameters and possibly other parameters, a model of electrical behaviour is selected out of the number of predefined models. The model is run and the result of the model is used to control the electrical behaviour of the wind power plant.

Figure 2:
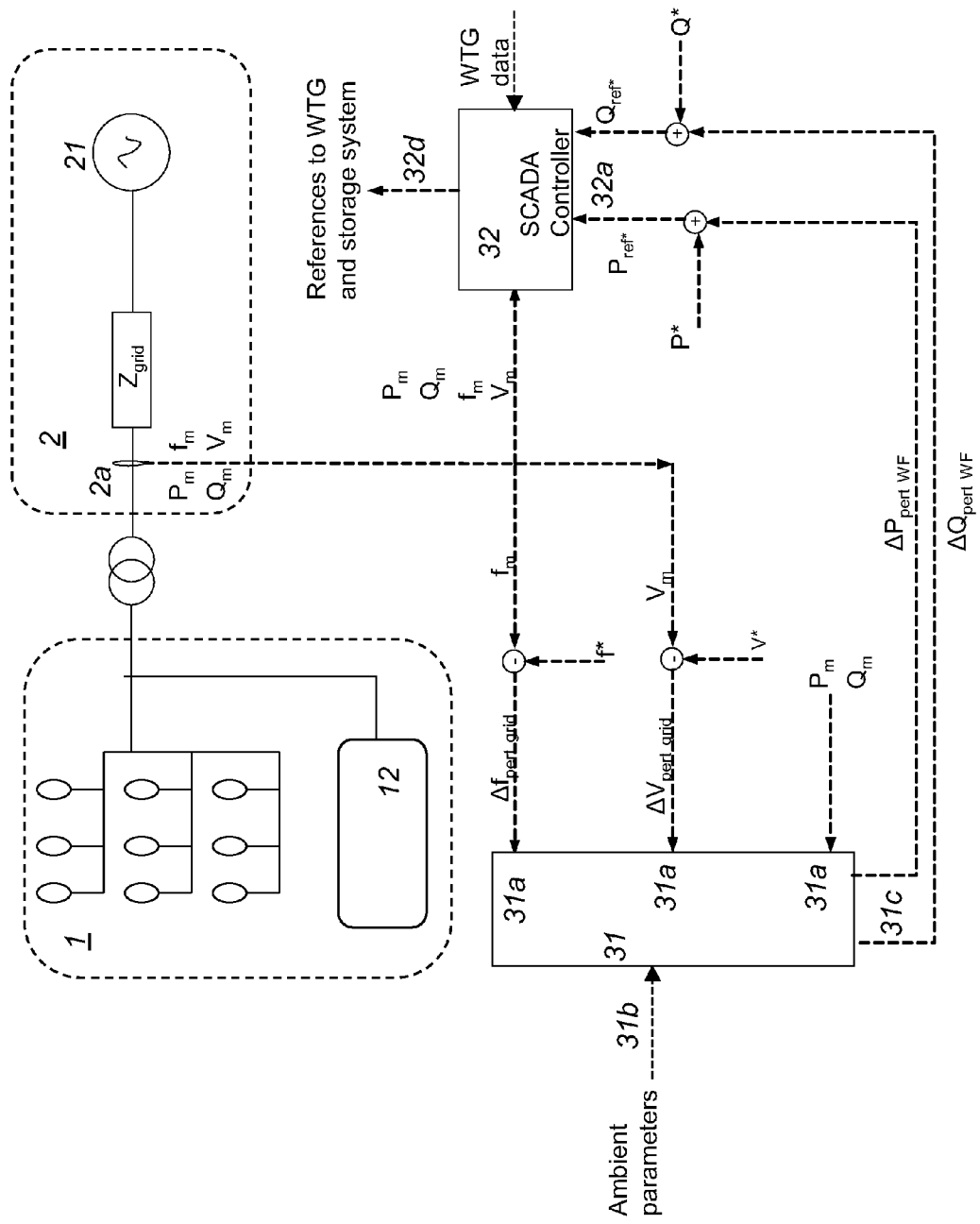
FIG. 2 diagrammatically illustrates a power system with a system for operating a wind power plant according to an embodiment of the invention.

FIG. 2 shows an embodiment of the invention for a control system for controlling or operating a wind power plant 1 connected to a power grid 2, illustrated by an impedance $Z_{grid}$ and a voltage source (21). In this embodiment the wind power plant has, or is connected to, a power storage system 12 or other systems, such as capacitors banks, static VAr compensator. Alternatively, the power storage system may be replaced by a power dissipation system. Thereby, the wind power plant could be controlled in many different ways; For example, the wind power plant could emulate the electrical behaviour of a load.

The control system has a modelling unit 31 and a control unit 32, a controller located e.g. in a Supervisory Control and Data Acquisition substation (SCADA) or in a Programmable Logic Controller (PLC). In the modelling unit 31, a number of different models for electrical behaviour that could be advantageous for the wind power plant is stored. Further, a number of criteria may be set up in the modelling unit for selecting which of the models to use.

When the control system is used in real-time, values of a number of grid parameters e.g. active power $P_m$, reactive power $Q_m$, grid voltage $V_m$, grid frequency $f_m$ are detected or measured at a point 2a of the power grid. The modelling unit has a first input 31a for receiving the detected values of the grid parameters, which parameters may be used for selecting which model to use. Further, the modelling unit has a second input 31b for receiving data of ambient parameters, such as detected wind force and electricity price in the power grid, which ambient parameters may also be used for selecting which model to use. In an embodiment of the invention, the modelling unit may have a third input (not shown) for receiving an external input command signal, which input signal may be used for selecting which model to use.

When the model to be used has been selected, the selected model is run in the modelling unit 31, based on the detected grid values or modifications of the detected grid values. Input values to the modelling unit are illustrated in the figure by the parameters $\Delta f_{pertgrid}$ and $\Delta V_{pertgrid}$, meaning a frequency/Voltage change at a perturbation of the grid. In this embodiment, the input values to the modelling unit is a frequency change and voltage change in comparison to a nominal frequency f* and a nominal voltage V*. Although, it may be possible to use the detected grid values directly in the model without modification. When the model has been run, the result of the model is output from the modelling unit at its output 31c as electrical output values $\Delta P_{pertWF}$, $\Delta Q_{pertWF}$ which will be used as input values to the SCADA controller 32 for controlling the wind power plant.

The SCADA controller 32 has an input 32a for receiving the electrical output values from the modelling unit. It may be possible that the electrical output values $\Delta P_{pertWF}$, $\Delta Q_{pertWF}$ are modified before they are received at the input 32a. According to the figure, the electrical output values $\Delta P_{pertWF}$, $\Delta Q_{pertWF}$ are modified by adding nominal values P*, Q* to the calculated electrical reference values, according to the following:

$$P_{ref^*} = \Delta P_{pertWF} + P^*.$$

$$Q_{ref^*} = \Delta Q_{pertWF} + Q^*.$$

The SCADA controller is arranged to calculate electrical reference values for each WTG and for the power storage system to make the wind power plant react to produce electrical output values (real power and reactive power in this case) in the best possible way for the wind power plant, based on the calculated electrical reference values $P_{ref^*}$ and/or $Q_{ref^*}$. The electrical reference values for each WTG and power storage system may also be calculated using the measured grid parameter values $P_m$, $Q_m$, $V_m$, $f_m$ as input and/or information of nominal frequency f* and voltage V*, and/or WTG data such as number of WTGs that are on-line or the individual power of each WTG. The electrical reference values for each WTG and for the power storage system are output at output 32d and taken to each WTG and power storage system, respectively.

Below, two possible models that could be used in the invention are explained. In a first model, the wind power plant is emulated as a synchronous machine. I.e. the model describes a synchronous machine connected to a power grid, wherein the synchronous machine has the same inertia as the wind power plant. A synchronous machine offers advantages when it comes to compensating frequency disturbances in the grid. This model may be selected if the frequency of the grid is disturbed. If the detection of grid parameters indicates a frequency disturbance, the first model will be selected in real-time. The first model will be run, using the detected up-to-date values of the grid frequency, and an output power variation will be calculated for the emulated synchronous machine. The calculated output power variation will then be used as input values for controlling the wind power plant and consequently the individual wind power plant components, such as the WTGs. As a result, from the grid point of view, the wind power plant will behave electrically as a synchronous power plant during the frequency disturbance.

In a second possible model that may be used in the invention, the wind power plant is emulated as a load, such as a load for active power or a type of reactive power load. For being able to use the results of this model onto the wind power plant, the wind power plant is equipped with an energy storage system or an energy dissipation system. This second model may be selected based on the value of an ambient parameter, such as based on the current electricity price or time of day. The second model may also be selected if electricity demand in the network is currently lower than electricity supply. If the wind power plant would act as a load from the power grid point of view, grid frequency fluctuations could be reduced. If the second model is selected, the second model will be run using the detected values of the grid parameters. Thereafter, the electrical output values calculated by the model, such as power level to be absorbed/dissipated for the load of the model, is used to calculate a suitable electrical reference value of the wind power plant, such as power level to be absorbed/dissipated by the wind power plant. Eventually, the WTGs and the power storage (or dissipation) system will be controlled to achieve the calculated electrical reference value of the wind power plant.

The second model has for example the following advantages: Power output curves of wind power plants are easily below 5% of nominal power during 20% of their life time. By installing a power storage or dissipation system in a wind power plant, the wind power plant can imitate the behaviour of certain loads, i.e. the wind power plant consumes power from the grid instead of supplying the grid with power, according to the invention. This could be economically advantageous if e.g. there is no wind and at the same time the electricity demand/price is low. The energy stored in the power storage system could then be supplied to the grid when the electricity demand/price is higher. I.e. forecasting values for electricity price together with wind forecasting could be used in order to optimize the economical profits of the wind farm. As a result, it would help integrating wind power plants into power systems.

The load may also be a load for reactive power, for controlling the reactive power balance in the grid.

According to an embodiment, for making the wind power plant work as a load, an energy storage system (mainly for active power) and/or a power reactive compensator (mainly for reactive power) may be used in the wind power plant. AS an alternative, at least one of the WTGs may be arranged to function as a load instead of as a generator, if necessary. (The WTG then works as a 'ventilator' or fan and uses electricity).

Figure 3:
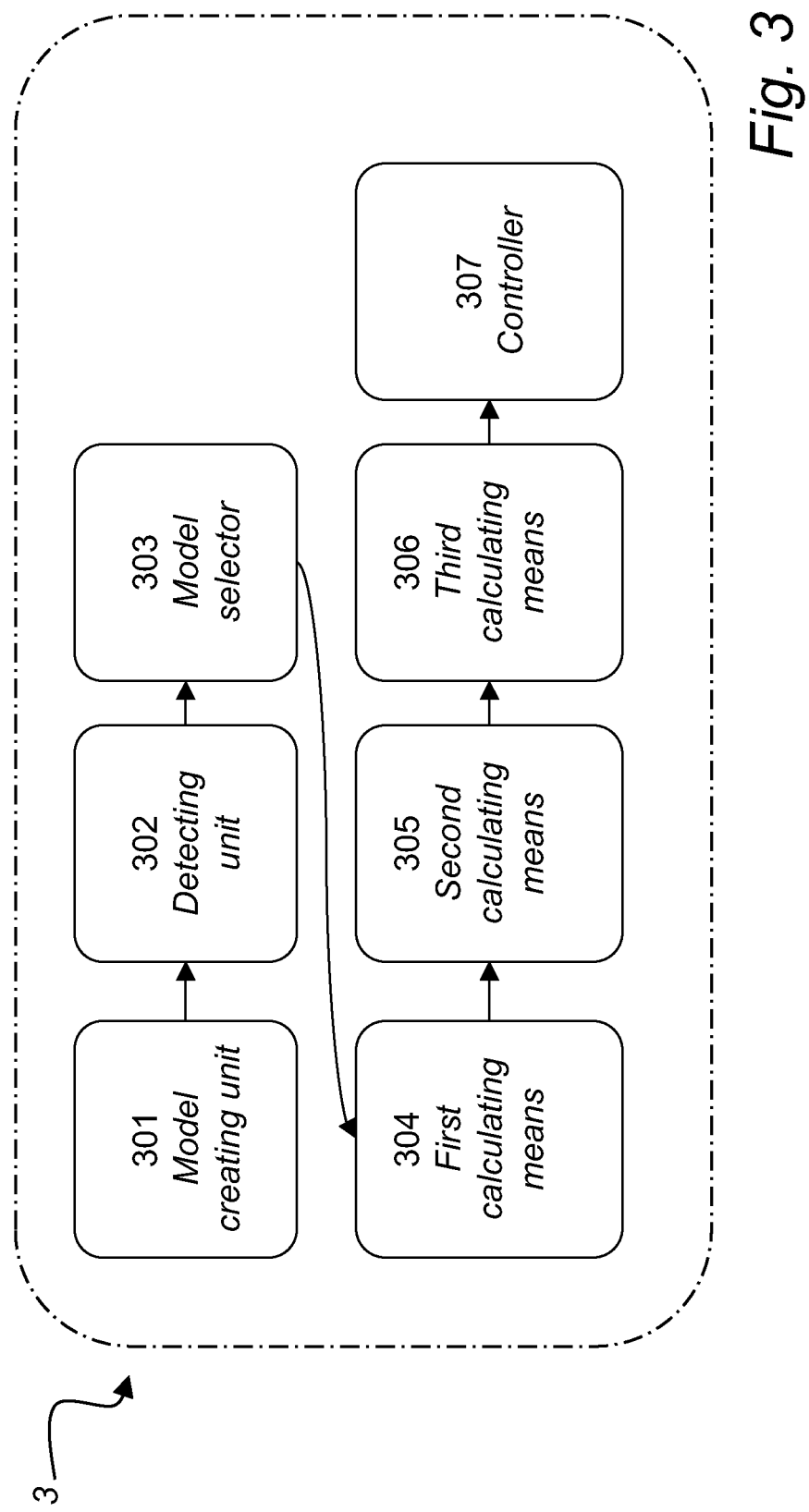
FIG. 3 is a schematic block diagram showing the functional units of a system for operating a wind power plant according to an embodiment of the invention.

FIG. 3 shows an embodiment of a system 3 according to the invention for operating a wind power plant connected to a power network.

The system has a model creating unit 301 in which a number of models are set up in advance. Each model describes a certain type of electrical behaviour that may be possible and advantageous for a wind power plant. In other words, each model emulates an electrical behaviour of a certain type of electrical system connected to a power grid. One type of model is a model emulating electrical behaviour of a synchronous power plant. This type of model is especially advantageous for frequency perturbations in the grid. Another type of model emulates electrical behaviour of a load.

The system further has a detecting unit 302 connected to the model creating unit 301 for detecting values of grid parameters, i.e. of any of the following: active power $P_m$, reactive power $Q_m$, grid voltage $V_m$, grid frequency $f_m$.

According to an embodiment, the detecting unit 302 may further be arranged for detecting ambient parameters, such as wind speed or electricity price.

Also, in the system there is a model selector 303 connected to the detecting unit 302 for selecting one of the number of models that were created in the model creating unit. The model selector is arranged to select which model to use for the moment, based on a number of information out of a set comprising the detected grid parameter values, ambient parameters and an external command signal. For example, if an electricity price parameter, which is considered as an ambient parameter, signals that the electricity price is below the running costs of the wind power plant, this second model emulating electrical behaviour of a load may be selected.

A first calculation means 304, or modelling unit connected to the model selector 303 is arranged to run the selected model to calculate electrical output values, e.g. power values, of the selected model based on the detected grid parameter value. A second calculation means 305 connected to the first calculation means 304 is arranged to calculate electrical reference values, such as output power values, of the wind power plant based on the output values calculated for the model. According to an embodiment, the calculation in the second calculation means is performed by simply taking the electrical output values calculated for the model and use them as electrical reference values for the wind power plant.

The system further comprises a third calculation means 306 connected to the second calculation means 305 for calculating electrical reference values for each wind turbine generator based on the calculated electrical reference values for the wind power plant. Lastly, the control system comprises a controller 307 connected to the third calculation means 306 for controlling the wind turbine generators according to the calculated electrical reference values for each wind turbine generator. Alternatively, the controller may be separate from the system according to the invention, i.e. the system may calculate reference values for the WTGs, which reference values will be used by a separate controller for controlling the WTGs.

The wind power plant to be operated by the system of the invention may also comprise an energy storage system. In this case, in an embodiment, the third calculation means 306 may further be arranged for calculating electrical reference values for the energy storage system, based on the calculated output power values for the wind power plant, and the controller 307 may further be arranged for controlling the energy storage system according to the calculated electrical reference values. Alternatively, or in addition to the energy storage system, the wind power plant may comprise a compensator for reactive power. In this case the third calculation means 306 may further be arranged for calculating electrical reference values for the compensator for reactive power based on the calculated output power values for the wind power plant, and the controller 307 may further be arranged for controlling a compensator for reactive power according to the calculated electrical reference values.

Further, the first, second and third calculation means may be arranged in one and the same unit or in different units.

Figure 4:
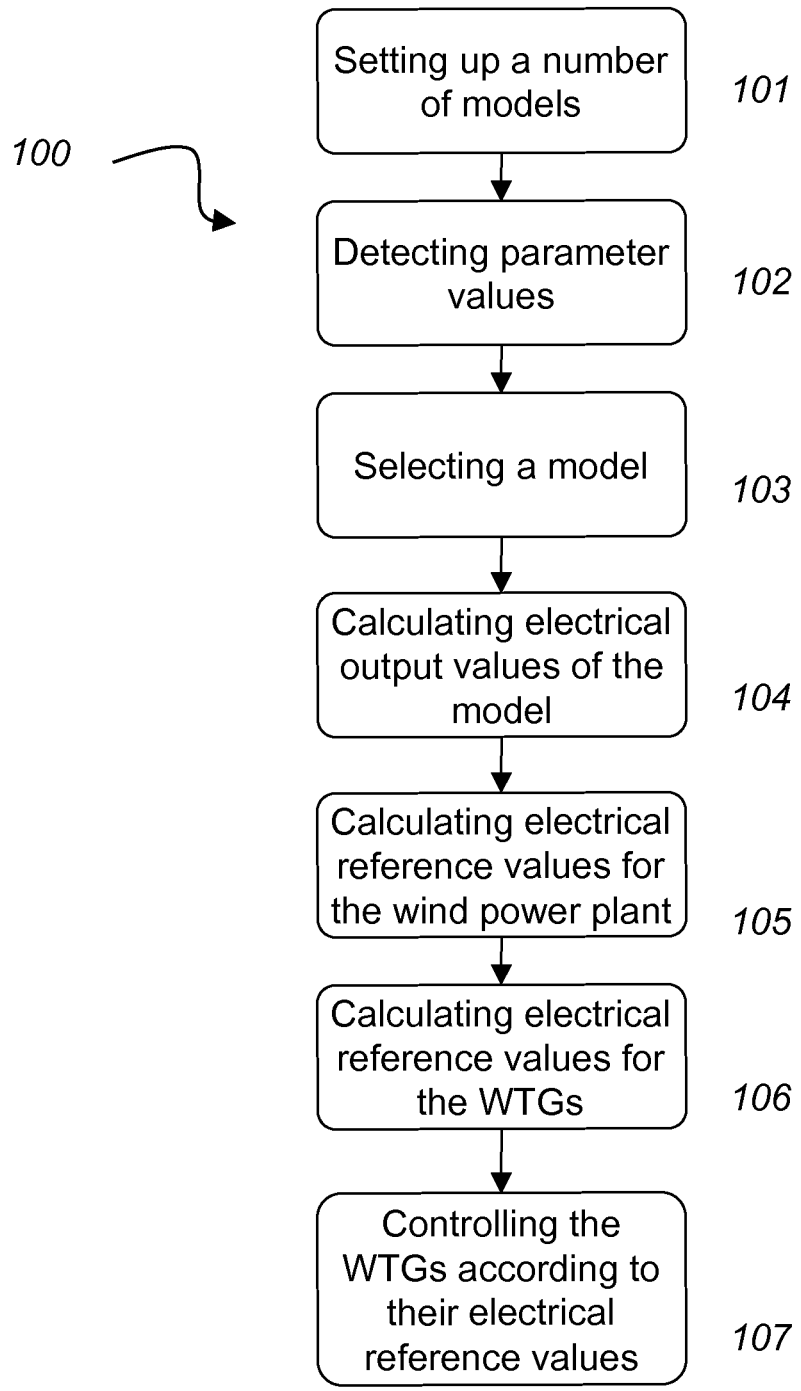
FIG. 4. is a flow chart showing a method for controlling a wind power plant, according to an embodiment of the invention.

FIG. 4 illustrates a method 100 for operating a wind power plant according to an embodiment of the invention. The method comprises the following steps: Setting up 101 a number of different models, each model emulating an electrical behaviour of an electrical system, such as a load or a power generating unit, connected to the power grid; Detecting 102 values of the power grid parameters; Selecting 103 one of the number of models, based on a number of values out of a set comprising the detected power grid parameter values and an external command signal; In the selected model, calculating 104 electrical output values of the model, based on the detected grid parameter values; Calculating 105 electrical reference values for the wind power plant, based on the calculated electrical output values of the model; Calculating 106 electrical reference values for each wind turbine generator based on the calculated electrical reference values for the wind power plant; Controlling 107 the wind turbine generators according to the calculated electrical reference values for each wind turbine generator. The step of controlling 107 the WTGs may be outside the method of the invention, i.e. the calculated reference values for the WTGs, may be used in a separate method for controlling the WTGs.

Figure 5:
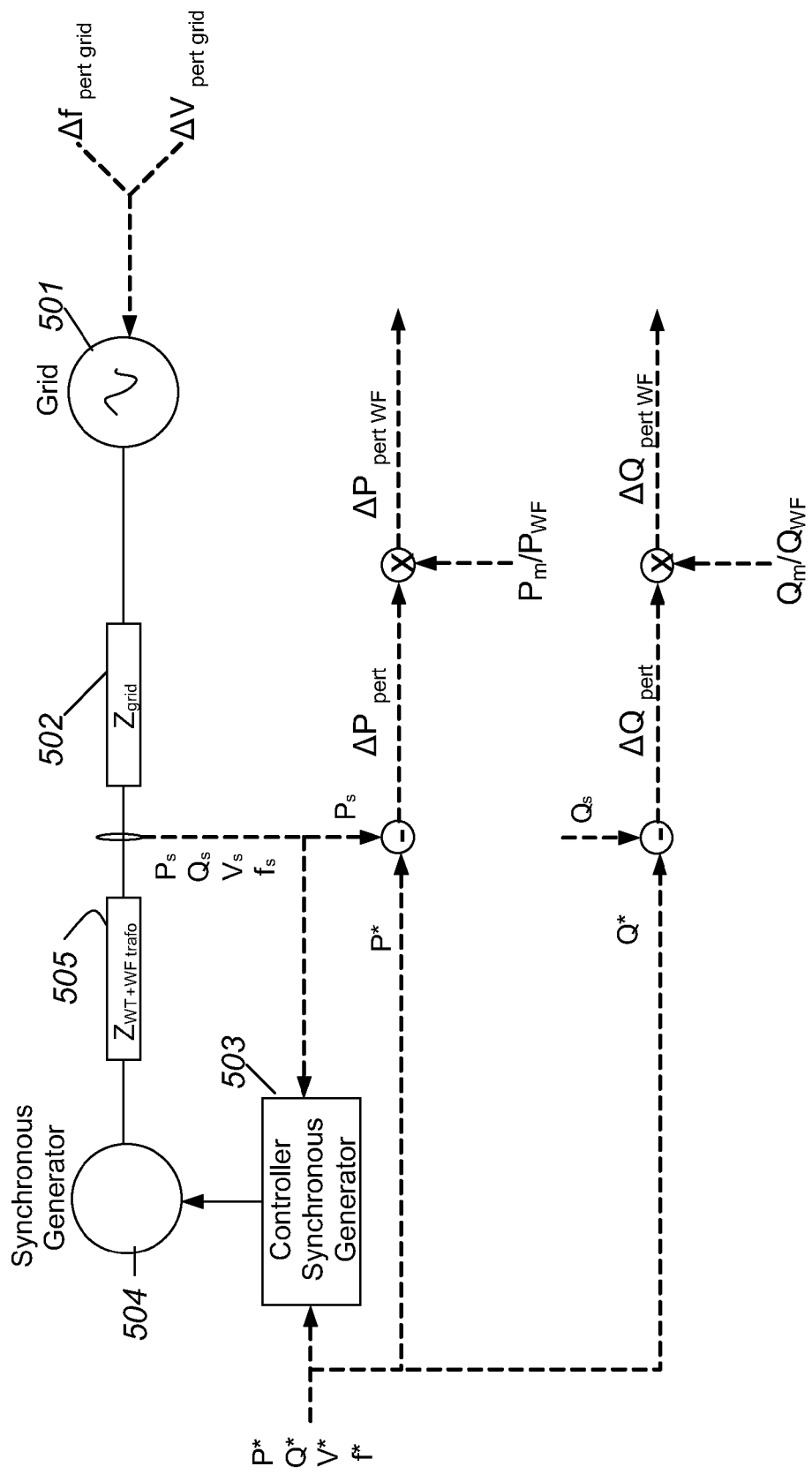
FIG. 5 diagrammatically illustrates a model of a synchronous generator according to an embodiment of the invention.

FIG. 5 illustrates a system according to the invention when using a model for emulating a synchronous machine. The model for emulating a synchronous machine is selected since the power grid is experiencing a disturbance $\Delta f_{pertgrid}$ of its frequency and/or a disturbance $\Delta V_{pertgrid}$ of its voltage, which disturbance may be partly alleviated by the wind power plant acting like a synchronous machine. The grid is modelled as a voltage source 501 and a grid impedance $Z_{grid}$ 502, with an impedance value preferably as close as possible to the real impedance value. A synchronous machine is modelled with a synchronous generator controller 503 controlling a synchronous generator 504 and with an impedance 505 similar to the impedance of the wind power plant. When this model is run, the detected real-time data $\Delta f_{pertgrid}$, $\Delta V_{pertgrid}$ of the power grid to which the wind power plant is connected is used as input data. The calculated output data of the synchronous generator model $\Delta P_{pert}$, $\Delta Q_{pert}$ is used as reference values for the wind power plant.

According to an embodiment, ambient parameters, such as electricity price, time of day, wind speed etc. may be detected by the system of the invention, or values of the ambient parameters may be detected outside the system and received by the system, as described in FIG. 2.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for operating a wind power plant connected to a power grid, the wind power plant comprising a number of wind turbine generators, the method comprising:
 detecting one or more values of a plurality of power grid parameters;
 selecting a model from a plurality of different models, based on at least one of: the one or more detected values of the plurality of power grid parameters, one or more ambient parameter values, and an external command signal; wherein each of the models from the plurality of different models emulates an electrical behavior of an electrical system connected to the power grid;
 in the selected model, calculating electrical output values of the model, based on the detected grid parameter values;
 calculating electrical reference values for the wind power plant, based on the calculated electrical output values of the model;
 calculating electrical reference values for each wind turbine generator based on the calculated electrical reference values for the wind power plant; and
 controlling the wind turbine generators in the wind power plant based on the calculated electrical reference values for each wind turbine generator.

2. The method of claim 1, wherein the one or more ambient values comprise values forecasting an ambient parameter.

3. The method of claim 1, wherein the wind power plant further comprises at least one of an energy storage system and a power reactive compensator, the method further comprising:
calculating electrical reference values for at least one of the energy storage system and the power reactive compensator, based on the calculated reference values for the wind power plant.

4. The method of claim 3, further comprising:
controlling at least one of the energy storage system and the power reactive compensator according to the calculated electrical reference values for at least one of the energy storage system and the power reactive compensator.

5. The method of claim 1, wherein the one or more power grid parameter values are detected in real-time.

6. The method of claim 1, wherein the one or more ambient parameter values are detected in real-time.

7. The method of claim 1, wherein each of the one or more power grid parameters comprises a value indicating an electrical disturbance of the grid.

8. A system for operating a wind power plant connected to a power grid, the wind power plant comprising a number of wind turbine generators, the system comprising:
a detecting unit for detecting one or more values of a plurality of power grid parameters;
a modeling unit configured to store a plurality of different models, each model emulating an electrical behavior of an electrical system connected to the power grid, wherein the modeling unit is further configured to select one of the plurality of models, based on at least one of: the one or more values of the plurality of power grid parameters, one or more ambient parameter values, and an external command signal;
a first model calculator configured to calculate electrical output values of the model, based on the one or more detected grid parameter values;
a second model calculator configured to calculate electrical reference values for the wind power plant, based on the calculated electrical output values of the model;
a third model calculator configured to calculate electrical reference values for each wind turbine generator based on the calculated electrical reference values for the wind power plant; and
a controller for controlling the wind turbine generators according to the calculated electrical reference values for each wind turbine generator.

9. The system of claim 8, wherein the wind power plant further comprises an energy storage system and/or a power reactive compensator, and the third calculation means is further arranged for calculating electrical reference values for the energy storage system and/or the power reactive compensator, based on the calculated electrical reference values for the wind power plant.

10. The system of claim 9, further comprising:
a controller for controlling the energy storage system and/or the power reactive compensator according to the calculated electrical reference values for the energy storage system and/or the power reactive compensator.

11. The system of claim 8, wherein the one or more power grid parameter values and/or the one or more ambient parameter values are detected in real-time.

12. The system of claim 8, wherein each of the one or more power grid parameter values is a value indicating an electrical disturbance of the grid.

13. A computer program product that, when executed on a computer, operates a wind power plant connected to a wind power plant comprising a number of wind turbine generators, the computer program product comprising:
computer-readable program code to record one or more values of a plurality of power grid parameters;
computer-readable program code to select a model from a plurality of different models, based on at least one of: the one or more recorded values of the plurality of power grid parameters, one or more ambient parameter values, and an external command signal; wherein each of the models from the plurality of different models emulates an electrical behavior of an electrical system connected to the power grid;
computer-readable program code to calculate electrical output values of the selected model, based on the recorded grid parameter values;
computer-readable program code to calculate electrical reference values for the wind power plant, based on the calculated electrical output values of the model;
computer-readable program code to calculate electrical reference values for each wind turbine generator based on the calculated electrical reference values for the wind power plant; and
computer-readable program code to output control signals to the wind turbine generators, based on the calculated electrical reference values for each wind turbine generator.

14. The computer program product of claim 13, wherein the wind power plant further comprises at least one of an energy storage system and a power reactive compensator, wherein the computer-readable program code further comprises:
computer-readable program code to calculate electrical reference values for at least one of the energy storage system and the power reactive compensator, based on the calculated reference values for the wind power plant.

15. The computer program product of claim 14, further comprising computer-readable program code to control at least one of the energy storage system and the power reactive compensator according to the calculated electrical reference values for at least one of the energy storage system and the power reactive compensator.

16. The computer program product of claim 13, wherein each of the one or more power grid parameters comprises a value indicating an electrical disturbance of the grid.

17. The computer program product of claim 13, wherein the one or more ambient values comprise values forecasting an ambient parameter.

* * * * *